United States Patent
Ghabra et al.

(10) Patent No.: US 8,922,339 B2
(45) Date of Patent: Dec. 30, 2014

(54) MULTIPLE-CHANNEL RECEIVER SYSTEM AND METHOD

(75) Inventors: Riad Ghabra, Dearborn Heights, MI (US); Ronald O. King, Brownstone, MI (US); John Nantz, Brighton, MI (US); Tom Q. Tang, Novi, MI (US)

(73) Assignee: Lear Corporation, Southfield, MI (US)

( * ) Notice: Subject to any disclaimer, the term of this patent is extended or adjusted under 35 U.S.C. 154(b) by 549 days.

(21) Appl. No.: 11/161,935

(22) Filed: Aug. 23, 2005

(65) Prior Publication Data

US 2007/0046427 A1    Mar. 1, 2007

(51) Int. Cl.
*G05B 19/00* (2006.01)
*B60C 23/04* (2006.01)
*B60R 25/24* (2013.01)
*H04B 1/30* (2006.01)

(52) U.S. Cl.
CPC ......... *B60C 23/0408* (2013.01); *B60C 23/0433* (2013.01); *B60R 25/246* (2013.01); *H04B 1/30* (2013.01)
USPC ....................................... 340/5.72

(58) Field of Classification Search
USPC ............ 340/5.72, 5.64, 426.01, 426.36, 5.61, 340/825.72, 447, 426.15; 9/5.72, 5.64, 9/426.01, 426.36; 455/68
See application file for complete search history.

(56) References Cited

U.S. PATENT DOCUMENTS

| | | | |
|---|---|---|---|
| 5,442,340 A | 8/1995 | Dykema | |
| 5,463,374 A | 10/1995 | Mendez et al. | |
| 5,661,651 A * | 8/1997 | Geschke et al. | 701/88 |
| 6,438,467 B1 | 8/2002 | Pacsai | |
| 6,647,773 B2 | 11/2003 | Nantz et al. | |
| 6,885,282 B2 | 4/2005 | Desai et al. | |
| 6,885,283 B2 | 4/2005 | Desai et al. | |
| 2001/0052839 A1 * | 12/2001 | Nahata et al. | 340/5.72 |
| 2002/0087250 A1 | 7/2002 | Pacsai | |
| 2002/0177406 A1 * | 11/2002 | O'Connor et al. | 455/39 |
| 2005/0046545 A1 | 3/2005 | Skekloff et al. | |
| 2005/0099274 A1 | 5/2005 | Tranchina | |
| 2005/0104715 A1 | 5/2005 | Farrell | |
| 2005/0191966 A1 * | 9/2005 | Katsuta | 455/68 |

FOREIGN PATENT DOCUMENTS

| | | |
|---|---|---|
| DE | 4309422 C1 | 3/1993 |
| DE | 10164333 A1 | 9/2002 |
| DE | 10247149 A1 | 4/2004 |
| WO | 2004036788 A1 | 4/2004 |

OTHER PUBLICATIONS

Search Report Under Section 17, Application No. GB0616109.5, Date of Search: Sep. 27, 2006.
German Patent and Trademark Office, Office Action for corresponding German Patent Application No. 10 2006 025 949.1 mailed Nov. 8, 2012.

* cited by examiner

*Primary Examiner* — Nabil Syed
(74) *Attorney, Agent, or Firm* — Brooks Kushman P.C.

(57) ABSTRACT

A system and method for receiving signals from a tire pressure monitoring (TPM) system, a remote keyless entry (RKE) system, and a passive entry system in a manner that reduces the occurrence of signal interference includes transmitting at least a first signal to a receiver on the vehicle. The receiver is configured to have multiple channels for receiving the TPM signal, the RKE signal and/or the passive entry signal. The method also includes receiving the first signal on a first receiver channel. The method further includes selecting a second receiver channel for receiving at least a second signal when the second signal is or will be generated.

8 Claims, 3 Drawing Sheets

MULTIPLE-CHANNEL RECEIVER SYSTEM AND METHOD

TECHNICAL FIELD

The present invention is related to a system for receiving tire pressure monitoring (TPM), remote keyless entry (RKE), and passive entry signals in a vehicle.

BACKGROUND

Vehicles are equipped with various monitoring and security systems. These systems include tire pressure monitoring (TPM) systems and remote keyless entry (RKE) systems. A conventional tire pressure monitoring system is configured to monitor a parameter (e.g., tire pressure) of the vehicle's wheels. The RKE system enables a user to remotely lock and unlock the vehicle's doors. Conventional RKE systems are responsive to a key fob having buttons that cause the generation of signals that enable the activation of various vehicle systems such as a vehicle's door locking system, alarm system, and the like. Recently, passive entry systems have been integrated with vehicles, wherein a vehicle operator may lock and unlock his/her doors without pressing a button on a key fob. For example, with the passive entry systems, the vehicle operator may unlock the vehicle by simply placing the fob within a certain proximity of the vehicle. As such, the vehicle operator is not required to press buttons to activate vehicle systems or functions.

As described above, TPM, RKE, and passive entry systems enable the generation of signals for invoking various vehicle functions. These signals are received at a receiver. Although the conventional receiver is capable of receiving the TPM, RKE, and passive entry signals, there exists a wide horizon for improvement. In particular, there are many instances where, for example, the TPM signal and the passive entry signal are transmitted simultaneously. Additionally, these transmitted signals are conventionally transmitted at frequencies that result in signal interference, thereby causing the receiver to not receive the TPM signal and the passive entry signal. The same is true with RKE signals, which may be transmitted at the same frequencies and simultaneously with the TPM signals and/or the passive entry signals.

The present invention was conceived in view of these and other disadvantages of conventional TPM, RKE, and passive entry receivers.

SUMMARY

The present invention provides a system and method for receiving signals from a tire pressure monitoring (TPM) system, a remote keyless entry (RKE) system, and a passive entry system, in a manner that reduces the occurrence of signal interference. Accordingly, the method includes transmitting at least a first signal to a receiver on the vehicle, wherein the receiver has multiple channels configured to receive TPM signals, RKE signals and/or passive entry signals. The method also includes receiving the first signal on a first receiver channel and selecting a second receiver channel for receiving at least a second signal when the second signal is or will be generated.

The present invention also includes a vehicle receiver device for a vehicle having multiple channels in which to receive signals transmitted by the TPM system, the remote keyless entry system, and the passive entry system. The receiver is configured to monitor the transmission of signals from the TPM system, the RKE system, and the passive entry system through the use of a controller. The controller is also configured to receive at least a first signal on the first receiver channel and select an alternative receiver channel for receiving a second signal in response to the second signal being transmitted.

The above embodiments and other embodiments, features, and advantages of the present invention are readily apparent from the following detailed description of the best mode for carrying out the invention when taken in connection with the accompanying drawings.

BRIEF DESCRIPTION OF THE DRAWINGS

The features of the present invention which are believed to be novel are set forth with particularity in the appended claims. The present invention, both as to its organization and manner of operation, together with further advantages thereof, may be best understood with reference to the following description, taken in connection with the accompanying drawings in which:

DETAILED DESCRIPTION OF THE PREFERRED EMBODIMENT(S)

As required, detailed embodiments of the present invention are disclosed herein. However, it is to be understood that the disclosed embodiments are merely exemplary of the invention that may be embodied in various alternative forms. The figures are not necessarily to scale, and some features may be exaggerated or minimized to show details of particular components. Therefore, specific functional details disclosed herein are not to be interpreted as limiting, but merely as a representative basis for the claims and/or as a representative basis for teaching one skilled in the art to variously employ in the present invention.

Figure 1:
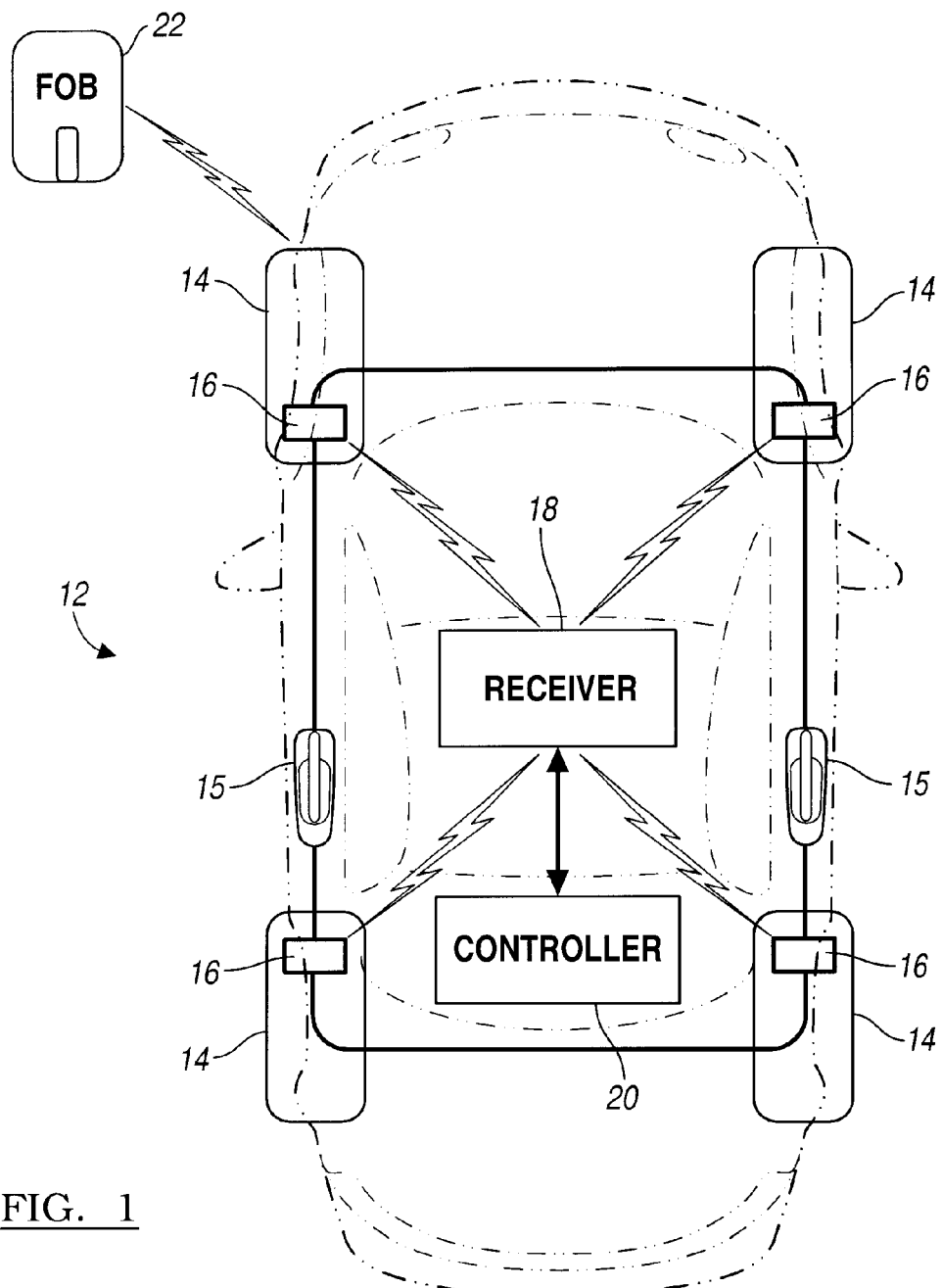
FIG. 1 depicts a vehicle diagram having a receiver for receiving signals from a tire pressure monitoring (TPM) system, a remote keyless entry (RKE) system, and a passive entry system according to an embodiment of the present invention.

Now referring to FIG. 1, a system diagram is illustrated that enables the reception of signals from a tire pressure monitoring (TPM) system, a remote keyless entry (RKE) system, and a passive entry system in a manner that reduces the occurrence of signal interference. As such, a vehicle 12 is shown that has sets of wheels 14. Tire pressure sensors 16 are integrated with wheels 14. In one embodiment, tire pressure sensors 16 may be directly coupled to or integrated with a valve stem (not shown) of wheels 14. Tire pressure sensors 16 are configured to sense the tire pressure of wheels 14 and wirelessly transmit a signal that is indicative of the sensed tire pressure to a receiver 18. Accordingly, receiver 18 transmits the tire pressure sensor information to a controller 20. Controller 20 is configured to process the signals received from receiver 18 and determine the condition of wheels 14 (e.g., over-inflated or under-inflated). Controller 20 is further configured to generate signals that enable a display (not shown) on vehicle 12 to notify a vehicle operator of the condition of wheels 14.

A key fob 22 (hereinafter referred to as "fob") is operable with vehicle 12 for controlling various vehicle functions. For example, fob 22 may be configured to enable locking and/or unlocking of the doors on vehicle 12. Fob 22 may also be capable of starting an engine, as well as activating an alarm system located on vehicle 12. Fob 22 may include buttons that invoke various commands vehicle 12 when pressed. Additionally, fob 22 may be configured to generate commands that invoke various vehicle functions by being placed within close proximity to vehicle 12. Accordingly, fob 22, being operable with receiver 18 and controller 20 comprise a remote keyless entry (RKE) system and a passive entry system.

The user may activate the passive entry system by activating a component of vehicle 12, such as a door handle 15. For example, the vehicle operator may toggle door handle 15, thereby causing the generation of a challenge signal that is transmitted to fob 22. In one aspect, the challenge signal is a command signal that requires fob 22 to respond by generating a corresponding signal that invokes a vehicle function. Additionally, the challenge signal may include data that pertains to a vehicle parameter, such as the tire pressure of wheels 14. Once the challenge signal is received by fob 22, fob 22 then generates a signal (typically a command signal such as a door unlocking command) that is received by receiver 18. The signal from 22 also indicates that fob 22 is specifically programmed for vehicle 12.

Conventionally, the TPM, RKE, and passive entry signals are transmitted at the same frequency (i.e., on the same channel). Additionally, it is common for these signals to be transmitted simultaneously. Thus, during simultaneous transmission of the TPM, RKE, and passive entry signals, signal interference occurs. Signal interference results in cancellation of the transmitted signals, thereby preventing the receiver from receiving the TPM, RKE, and passive entry signals.

Accordingly, to reduce the occurrence of signal interference, embodiments of present invention enable the TPM, RKE, and passive entry signals to transmitted on multiple channels. As such, receiver 18 is configured to have multiple channels in which to receive the transmitted signals. For example, receiver 18 may have a channel designated for the TPM signals, the RKE signals, and the passive entry signals. Additionally, in an alternative embodiment, the TPM and RKE signals may be received on a single channel, while the passive entry signals are received on a second channel. Furthermore, receiver 18 may be configured to have multiple channels that are dedicated to any combination of signals generated by the TPM system, RKE system, and passive entry system. It is also recognized that although the embodiments described herein are in the context of TPM, RKE, and passive entry systems, the present invention is applicable to virtually any circumstance where signals of the same frequency are simultaneously received.

Figure 2:
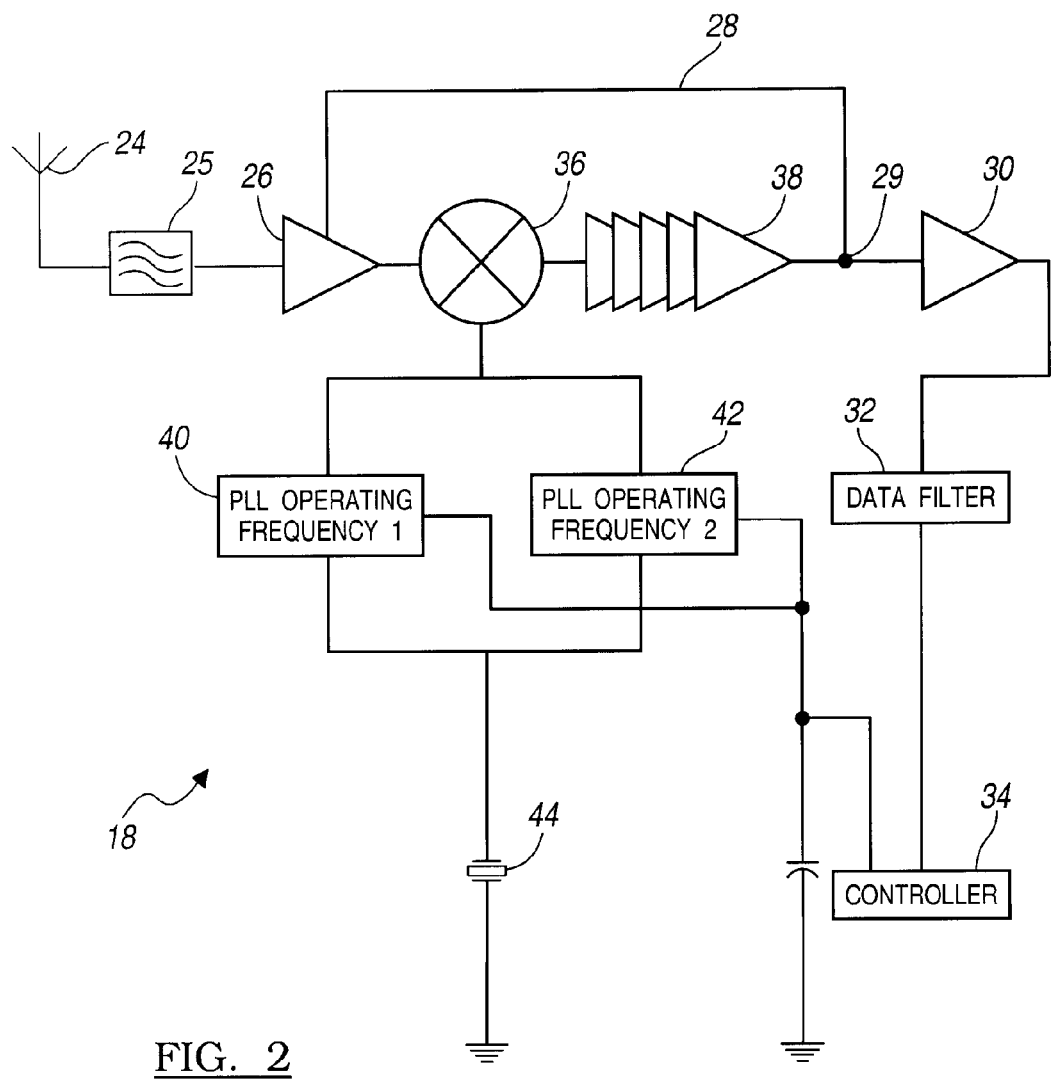
FIG. 2 illustrates a schematic diagram of the receiver of FIG. 1 according to an embodiment of the present invention.

Now referring to FIG. 2, a schematic diagram of receiver 18 is illustrated. As described above, receiver 18 is configured to have multiple channels in which to receive signals from the TPM system, the RKE system, and passive entry system. It is recognized that the embodiments shown in FIG. 2 illustrate a receiver configured to have two channels for receiving signals on two separate frequencies. However, receiver 18 may be adapted to have virtually any number of channels in which to receive signals transmitted via multiple frequencies. For example, receiver 18 may have a first receiver channel that is configured to receive RKE and passive entry signals, while a second receiver channel receives TPM signals. Additionally, the first receiver channel may be configured to receive TPM and RKE signals, while the second receiver channel receives TPM signals. Furthermore, receiver 18 may have a channel designated for each transmitted signal. For example, but not as a limitation, a first receiver channel may be designated for TPM channels, a second receiver channel for RKE signals, and a third receiver channel for passive entry signals. However, it is recognized that the designated channels in which to receive the TPM, RKE and passive entry signals are dependent upon the particular design requirements for receiver 18 and may vary depending upon system implementation.

Nevertheless, when TPM signals, RKE signals, or passive entry signals are transmitted, an antenna 24 initially receives the transmitted signals. A filter 25 filters the received signals and inputs the filtered signals into an amplifier 26. In one embodiment, amplifier 26 is a low noise amplifier. Additionally, the amplified signal from low noise amplifier 26 is input into a mixer 36. As will be described hereinafter, mixer 36 mixes signals from phase-locked loop devices 40 and 42 and amplifier 26. Amplifier 26 also has a gain control feedback 28 that is connected to the output of an amplifier 38 at a node 29 for providing signal feedback to enhance control.

The output of mixer 36 is input into amplifier 38, wherein amplifier 38 may be a high gain amplifier. The output of amplifier 38 is input into a data amplifier 30, which amplifies data received from the tire pressure monitor or the fob. The output of amplifier 30 is input into a data filter 32 which filters unnecessary noise from the amplified signal. The output of data filter 32 is input into a controller 34, which is configured to process the received signal and determine whether the received signal should be designated for the first or any alternative channels. Accordingly, as shown, the controller is coupled to the input of a PLL devices 40 and 42. PLL devices 40 and 42 are each coupled to a crystal oscillator 44 which is configured to set a frequency reference for PLL devices 40 and 42 Based on the inputs from controller 34, PLL devices 40 and 42 enable receiver 18 to select the first or alternative channel for receiving the TPM, RKE, and passive entry signals. As described above, PLL 40 and 42 are coupled to mixer 36, which mixes signals from PLL 40, 42, and amplifier 26. As such, the output of mixer 36 is input into amplifier 38 where the process for receiving and processing the transmitted signals continues.

Figure 3:
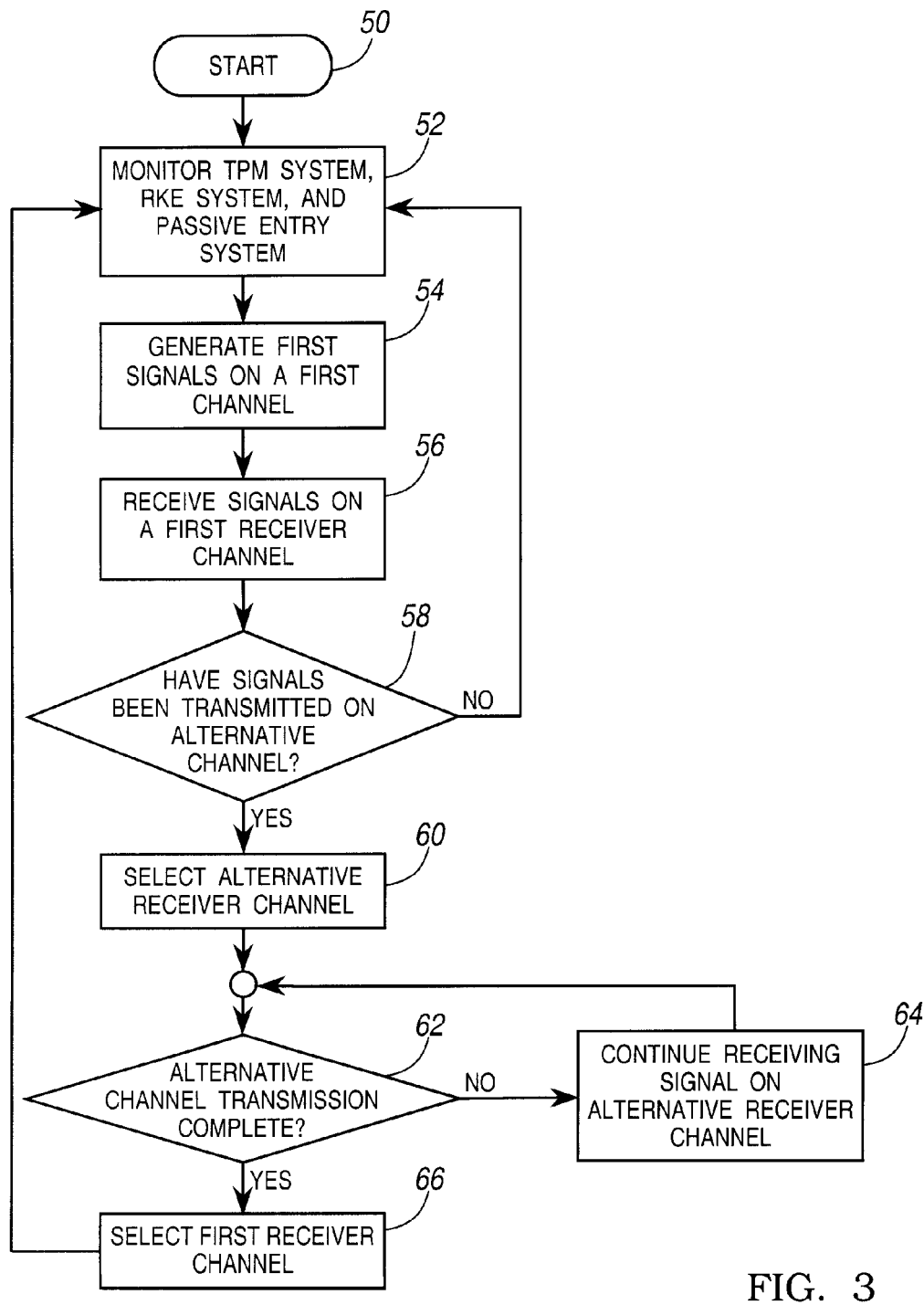
FIG. 3 illustrates a flow diagram of a method for receiving TPM, RKE, and passive entry signals in accordance with an embodiment of the present invention.

Now referring to FIG. 3, a flow diagram is illustrated of a method for receiving signals from the TPM system, the RKE system, and the passive entry system. As such, block 50 is an entry point into the method. As depicted by block 52, the method monitors the TPM system, the RKE system, and the passive entry system. As depicted by block 54, the method generates the first signals. It is recognized that the first signals may be TPM signals, RKE signals, or passive entry signals, or any combination thereof. As depicted by block 56, the method receives the first signals on a first receiver channel. For example, in one embodiment, the first receiver channel is configured to receive RKE and passive entry signals. In another embodiment, the first receiver channel may be configured to receive TPM and RKE signals or TPM and passive entry signals. As depicted by block 58, the method determines whether signals have been transmitted on an alternative channel or, in some embodiments, a second channel. In one embodiment, TPM signals are transmitted on the alternative channel. As described above, the receiver circuit is configured to have multiple channels in which to receive signals generated by the TPM system, RKE system, and passive entry system. As such, when signals other than those signals generated on the first channel are transmitted, the method selects the alternative receiver channel as depicted by block 60. As depicted by block 62, the method determines whether the alternative channel transmission is complete. It is recognized, however, that the signals transmitted on the alternative channel may include the RKE signals or the passive entry signals depending on the particular implementation of the present invention. Nevertheless, if the alternative channel transmission is not complete, the method continues receiving the signal on the alternative receiver channel, as depicted by block 64. If the alternative channel transmission is complete, the method then selects the first receiver channel for receiving signals that are generated on the first channel. Following block 66, the method returns to block 52.

As described above, the present invention provides a system and method for receiving TPM signals, RKE signals, and passive entry signals in a manner that reduces the occurrence of signal interference. It is recognized that the receiver may be configured to have multiple channels in which to receive the transmitted signals. As such, the receiver may be configured to receive, for example, RKE and passive entry signals on a first channel, while receiving TPM signals on an alternative channel. Additionally, in another embodiment, the first channel may be designated to receive TPM and RKE signals, while the alternative or second channel is designated to receive passive entry signals. Accordingly, the specific designation of receiver channels to transmitted signals may vary without departing from the scope of the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for receiving signals at a vehicle, the method comprising:
    configuring a receiver at the vehicle to tune to a first frequency channel having a first set of frequencies in order for the receiver to receive a remote keyless entry (RKE) signal transmitted from a key fob at a transmission frequency falling within the first frequency channel;
    configuring the receiver to tune from the first frequency channel to a second frequency channel, which has a second set of frequencies disjoint from the first set of frequencies, in order for the receiver to receive a passive entry signal transmitted from the key fob at a transmission frequency falling within the second frequency channel;
    maintaining the tuning of the receiver to the second frequency channel until the passive entry signal from the key fob has been received by the receiver;
    receiving by the receiver the passive entry signal from the key fob while the receiver is tuned to the second frequency channel; and
    configuring the receiver to tune from the second frequency channel back to the first frequency channel upon reception by the receiver of the passive entry signal from the key fob.

2. The method of claim 1 wherein:
    configuring the receiver to tune from the first frequency channel to the second frequency channel is done in response to the vehicle transmitting a challenge signal to the key fob, and the passive entry signal is responsive to the challenge signal.

3. The method of claim 2 wherein:
    the challenge signal is transmitted from the vehicle to the key fob in response to activation of a vehicle component.

4. The method of claim 3 wherein:
    the vehicle component is a door handle.

5. A method for receiving signals at a vehicle, the method comprising:
    configuring a receiver at the vehicle to tune to a first frequency channel having a first set of frequencies in order for the receiver to receive a tire pressure monitor (TPM) signal transmitted from a TPM system at a transmission frequency falling within the first frequency channel;
    configuring the receiver to tune from the first frequency channel to a second frequency channel, which has a second set of frequencies disjoint from the first set of frequencies, in order for the receiver to receive a passive entry signal transmitted from a key fob at a transmission frequency falling within the second frequency channel;
    maintaining the tuning of the receiver to the second frequency channel until the passive entry signal from the key fob has been received by the receiver;
    receiving by the receiver the passive entry signal from the key fob while the receiver is tuned to the second frequency channel; and
    configuring the receiver to tune from the second frequency channel back to the first frequency channel upon reception by the receiver of the passive entry signal from the key fob.

6. The method of claim 5 wherein:
    configuring the receiver to tune from the first frequency channel to the second frequency channel is done in response to the vehicle transmitting a challenge signal to the key fob, and the passive entry signal is responsive to the challenge signal.

7. The method of claim 6 wherein:
    the challenge signal is transmitted from the vehicle to the key fob in response to activation of a vehicle component.

8. The method of claim 7 wherein:
    the vehicle component is a door handle.

\* \* \* \* \*